United States Patent Office 3,355,394
Patented Nov. 28, 1967

3,355,394
STABLE WATER-IN-OIL DISPERSIONS AND PROCESS FOR THEIR MANUFACTURE
Helmut Korbanka, Hofheim, Taunus, and Fritz Soldan, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Nov. 2, 1964, Ser. No. 408,384
Claims priority, application Germany, Nov. 8, 1963, F 41,228
10 Claims. (Cl. 252—309)

The present invention relates to stable water-in-oil dispersions and to a process for their manufacture.

Water-soluble copolymers prepared from $\alpha$-$\beta$-unsaturated carbonamides, for example acrylic acid- and methacrylic acid amide, with acrylic acid esters have heretofore been suggested for use as neutral emulsifying and dispersing agents. Moreover, N-hydroxy-alkyl- or N-polyoxyalkyl carbonamides are used for the same purpose. It is assumed that the hydroxyalkyl- or polyoxyalkyl groups act as hydrophilic group and the carbonamide residue as hydrophobic group of the emulsifying agent.

Now we have found that oil-soluble copolymers of ethylene with N-vinyl carbonamides of the formula

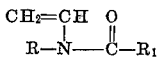

wherein R and $R_1$ each represent an alkyl-, aryl- or aralkyl radical or a methylene- or polymethylene group linked to a saturated ring, are suitable as emulsifying and dispersing agents for water-in-oil emulsions.

As N-vinyl carbonamide monomers which are present as a component in the copolymers of ethylene used according to the invention there are preferably mentioned N - methyl-N-vinyl-acetamide, N-isopropyl-N-vinyl-acetamide, N-hexyl-N-vinyl-acetamide, N-butyl N-vinyl-capronamide, N-decyl-N-vinyl-propionamide, N-methyl-N-vinyl-benzamide, N-phenyl-N-vinyl-acetamide, N-phenylethyl - N-vinyl-acetamide, N-vinyl-pyrrolidone, N-vinyl-piperidone and N-vinyl-caprolactam.

The preparation of the copolymers used according to the invention as emulsifying and dispersing agents may take place according to known methods with the use of radical-forming agents and at elevated pressures, for example according to the process of Belgian Patent 621,-116 or according to a copending U.S. application Ser. No. 408,372 filed Nov. 2, 1964.

The content of N-vinyl carbonamide in the ethylene-N-vinyl carbonamide copolymers may be 1 to 99 percent by weight. The only condition for the emulsifying-dispersing action is the oil-solubility of the products. Good emulsifying and dispersing properties are attained with a content of from 5 to 40 percent by weight, calculated on the copolymer, of N-vinyl carbonamide, in which case with the use of N-alkyl-N-vinyl-acylamides, especially N-vinyl-caprolactam and N-methyl-N-vinyl-acetamide, as comonomers of ethylene emulsifying agents of special efficiency are obtained.

The preparation of emulsions and dispersions with the aid of the emulsifying agents obtained according to the process of the present invention can take place in the usual manner, for example in emulsifiers, homogenizers, shaking-stirring devices and ultrasonic devices. There may be prepared, for example, emulsions of water in water-insoluble organic solvents, such as benzene, toluene, gasoline, liquid paraffin and other hydrocarbons, and in greases, oils and waxes.

Solutions of solid, water-insoluble substances, such as polyethylene wax, hard paraffin in organic solvents, for example benzene, toluene, liquid paraffin, olive oil, can be emulsified with water. Depending on the proportion of organic solvents to water, liquid emulsions or pastes are obtained. When dissolving the products prepared according to the invention in hot liquid paraffin or olive oil, ointment bases of a Vaseline-like consistency are obtained which can be emulsified with water without the addition of further emulsifying agents to yield stable pastes or ointments of the water-in-oil type.

The emulsifiers according to the invention are compatible in mixture with other neutral, anion- or cation-active emulsifying agents and are highly effective.

The emulsions obtained can be used with advantage in the preparation of products such as ointments, pastes or liquid emulsions used in pharmacy and cosmetics, for example as emulsifiable Vaseline-like ointment base, hydrophobic ointment for the protection of the tissue, sun screen lotions of the water-in-oil type, greasy skin creams, furthermore for use as floor-, furniture- and automobile polishes and as textile auxiliaries.

The following examples serve to illustrate the invention, but they are not intended to limit it thereto, the percentages being by weight:

Example 1

1 gram of a copolymer of ethylene and 23% (calculated on the copolymer) of N-vinyl caprolactam (RSV =0.306) was dissolved in the heat in 50 cc. liquid paraffin or 50 cc. olive oil. At 90° C., 50 cc. water were added thereto and the whole was stirred vigorously until cooling. Stable emulsions of the water-in-oil type were obtained. (The reduced specific viscosity (RSV) indicated in this example and in the following examples was measured in a 2% solution of the copolymers in xylene at 85° C.)

Example 2

3 grams of a polyethylene wax, 1.5 grams of a copolymer of ethylene and 33% (calculated on the copolymer) of N-vinyl caprolactam (RSV=0.245) and 3 grams silicon oil were dissolved in the heat in 40 cc. gasoline. 51 cc. water were emulsified in this solution at 90° C. The whole was stirred vigorously until cooling and a finely dispersed emulsion of the water-in-oil type was obtained.

Example 3

4 grams of a mixture of montan wax derivatives, 1.5 grams of a copolymer of ethylene and 19% (calculated on the copolymer) of N-vinyl caprolactam (RSV=0.285) and 3 grams silicon oil were dissolved in the heat in 40 cc. of gasoline. 51 cc. water were emulsified in this solution at 90° C. and a pasty emulsion of the water-in-oil type was obtained.

Example 4

3 grams of a polyethylene wax, 1.5 grams of a copolymer of ethylene and 7% (calculated on the copolymer) of N-vinyl-caprolactam (RSV=0.244) were dissolved in the heat in 40 cc. gasoline. 120 cc. water were emulsified in this solution at 90° C. and the whole was stirred until cooling. A white paste of the water-in-oil type was obtained.

Example 5

1.5 grams of a copolymer of 15% (calculated on the copolymer) of N-ethyl-N-vinyl-acetamide and ethylene (RSV=0.677) were dissolved in the heat in 40 cc. gasoline or 40 cc. benzene or 40 cc. liquid paraffin or 40 cc. olive oil. 50 cc. water were emulsified in the respective solution at 90° C. and the whole was stirred vigorously until cooling. There were obtained finely dispersed emulsions of different consistencies of the water-in-oil type. Highly fluid emulsions were obtained with the use of gasoline or benzene, while viscous emulsions were obtained with the use of olive- or paraffin oil.

*Example 6*

With the use of 1 gram of a copolymer of 14.5% (calculated on the copolymer) of N-methyl-N-vinyl-acetamide with ethylene (RSV=0.4) as emulsifying agent, the process was carried out as described in Example 5. Emulsions of the water-in-oil type were obtained, whose consistency corresponds to that of the samples mentioned in Example 5.

*Example 7*

The process was carried out as described in Example 5 with the exception that 1 gram of a copolymer of 10% (calculated on the copolymer) of N-methyl-N-vinyl-propionamide with ethylene (RSV=0.532) was used as emulsifying agent. Emulsions of the water-in-oil type were obtained whose consistency corresponds to that of the samples mentioned in Example 5.

*Example 8*

With the use of 1 gram of a copolymer of 20% (calculated on the copolymer) of N-vinyl-pyrrolidone and ethylene (RSV=0.193), the process was carried out as described in Example 5. There were likewise obtained finely dispersed emulsions of the water-in-oil type whose consistency corresponds to that of the samples mentioned in Example 5.

*Example 9*

10 grams stearyl alcohol, 2.5 grams of a copolymer of 33% (calculated on the copolymer) of N-vinyl-caprolactam and ethylene (RSV=0.245) were dissolved in the heat in 35 grams liquid paraffin or olive oil. 5 grams glycerin were aded thereto and, in a bowl for the preparation of ointments, 20 grams water were stirred into the solution which was still warm. In both cases ointments were obtained of the water-in-oil type that had a highly salvy consistency (greasy skin creams).

*Example 10*

15 grams of a copolymer of 33% (calculated on the copolymer) of N-vinyl-caprolactam and ethylene (RSV=0.245) were dissolved in the heat in 90 grams of liquid paraffin. After cooling an emulsifiable ointment base of a petroleum jelly-like consistency was obtained.

*Example 11*

30 grams of an ointment base, prepared as described in Example 10, were stirred up in the cold with 20 grams of water in a bowl for the preparation of ointments. There was obtained an ointment which could be rubbed in easily and which had a strong hydrophobic effect.

We claim:

1. In the process for the manufacture of a stable water-in-oil dispersion by dispersing water in a water-insoluble oily material consisting essentially of a liquid aliphatic or aromatic hydrocarbon, grease, oil or wax, the improvement which comprises adding as dispersing agent a copolymer of ethylene and a compound of the formula

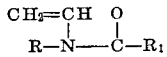

wherein R and R₁ are members selected from the group consisting of alkyl-, aryl-, aralkyl-groups and methylene groups linked to a saturated ring, said dispersing agent being oil-soluble.

2. The process of claim 1, wherein the dispersing agent is a copolymer of ethylene and 5–40 percent by weight, calculated on the copolymer, of a compound of the formula

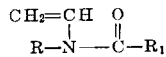

wherein R and R₁ are members selected from the group consisting of alkyl-, aryl-, aralkyl-groups and methylene groups to a saturated ring, said dispersing agent being oil-soluble.

3. The process of claim 1, wherein the dispersing agent is a copolymer of ethylene and N-vinyl-caprolactam, said copolymer being oil-soluble.

4. The process of claim 1, wherein the dispersing agent is a copolymer of ethylene and N-methyl-N-vinyl-acetamide, said copolymer being oil-soluble.

5. A stable water-in-oil dispersion consisting essentially of water, a water-insoluble substance consisting essentially of a liquid aliphatic or aromatic hydrocarbon, grease oil or wax, in which the water is dispersed, and an oil-soluble copolymer of ethylene with a compound of the formula

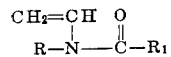

wherein R and R₁ are selected from the group consisting of alkyl, aryl and aralkyl, and R and R₁ together represent an alkylene group forming a saturated ring, as dispersing agent for the water.

6. The dispersion of claim 5 wherein the water-insoluble substance is a water-insoluble organic solvent of the group consisting of benzene, toluene, gasoline and paraffin.

7. The dispersion of claim 5 wherein the water-insoluble substance is a solution of a solid water-insoluble substance in an organic solvent.

8. The dispersion of claim 5 wherein the dispersing agent is an oil-soluble copolymer of ethylene and 5–40 percent by weight, calculated on the polymer, of a compound of the formula

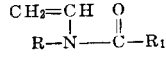

wherein R and R₁ are selected from the group consisting of alkyl, aryl and aralkyl, and R and R₁ together represent an alkylene group forming a saturated ring.

9. The dispersion of claim 5 wherein the dispersing agent is an oil-soluble copolymer of ethylene and N-vinyl caprolactam.

10. The dispersion of claim 5 wherein the dispersing agent is an oil-soluble copolymer of ethylene and N-methyl-N-vinyl-acetamide.

References Cited

UNITED STATES PATENTS 2,335,454  11/1943  Schuster et al. _____ 260—88.3
3,207,732  9/1965   Lynn _____ 260—29.6

FOREIGN PATENTS 1,022,796  5/1960  Germany.

SAMUEL H. BLECH, *Primary Examiner.*

MURRAY TILLMAN, *Examiner.*

W. J. BRIGGS, *Assistant Examiner.*